US012000354B2

(12) United States Patent
Yamamoto et al.

(10) Patent No.: US 12,000,354 B2
(45) Date of Patent: Jun. 4, 2024

(54) INTERNAL COMBUSTION ENGINE

(71) Applicant: ISUZU MOTORS LIMITED, Tokyo (JP)

(72) Inventors: Kazunari Yamamoto, Fujisawa (JP); Misao Goto, Fujisawa (JP); Takumi Komiyama, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/128,793

(22) Filed: Mar. 30, 2023

(65) Prior Publication Data

US 2023/0332558 A1 Oct. 19, 2023

(30) Foreign Application Priority Data

Apr. 13, 2022 (JP) ................................ 2022-066317

(51) Int. Cl.
*F02F 11/00* (2006.01)
*F02F 1/18* (2006.01)
*F02F 1/00* (2006.01)

(52) U.S. Cl.
CPC ............ *F02F 11/002* (2013.01); *F02F 1/183* (2013.01); *F02F 2001/006* (2013.01)

(58) Field of Classification Search
CPC .... F02F 2001/006; F02F 11/002; F02F 1/004; F16J 10/04; F16J 15/0881
USPC .......................................................... 277/591
See application file for complete search history.

(56) References Cited

U.S. PATENT DOCUMENTS

| | | | | |
|---|---|---|---|---|
| 2,939,753 A | | 10/1958 | Schilling et al. | |
| 4,112,907 A | * | 9/1978 | Nikly | F02F 1/24 123/193.3 |
| 4,474,147 A | * | 10/1984 | Hoopes | F16J 15/0881 277/601 |
| 4,513,703 A | | 4/1985 | Eckert | |
| 4,513,978 A | * | 4/1985 | Nicholson | F16J 15/0881 123/193.3 |
| 4,774,917 A | | 10/1988 | Tokoro | |
| 5,112,066 A | * | 5/1992 | Remmerfelt | F16J 15/0887 277/606 |
| 5,154,433 A | | 10/1992 | Naruse | |
| 6,036,194 A | | 3/2000 | Stamper | |
| 6,196,179 B1 | * | 3/2001 | Frantzheld | F02F 11/002 277/653 |

(Continued)

FOREIGN PATENT DOCUMENTS

| | | | |
|---|---|---|---|
| CN | 211819644 U | 10/2020 | |
| DE | 3236185 A1 | 4/1984 | |

(Continued)

*Primary Examiner* — Long T Tran
*Assistant Examiner* — James J Kim
(74) *Attorney, Agent, or Firm* — PROCOPIO, CORY, HARGREAVES & SAVITCH LLP

(57) ABSTRACT

An internal combustion engine includes: a cylinder in which a piston reciprocates; a cylinder head positioned above the cylinder; a gasket disposed between the cylinder and the cylinder head; a stepped portion that is formed at an upper end portion of an inner peripheral surface of the cylinder and positioned below the gasket; a ring member having a cylindrical shape provided to the stepped portion; and a protrusion portion that is formed in a manner to protrude from the ring member and bites into a lower surface of the gasket.

10 Claims, 4 Drawing Sheets

(56) References Cited

U.S. PATENT DOCUMENTS

| | | | | |
|---|---|---|---|---|
| 6,367,463 | B1 | 4/2002 | Nurmi | |
| 6,367,848 | B1 | 4/2002 | Bruce et al. | |
| 2007/0107689 | A1 | 5/2007 | Oogake et al. | |
| 2013/0068188 | A1 | 3/2013 | Liander et al. | |
| 2017/0002734 | A1* | 1/2017 | Watanabe | F02F 1/20 |
| 2018/0266359 | A1 | 9/2018 | Beasley | |
| 2023/0026354 | A1 | 1/2023 | Terakado et al. | |

FOREIGN PATENT DOCUMENTS

| | | | |
|---|---|---|---|
| JP | S55-112023 | U | 8/1980 |
| JP | S56-011345 | U | 1/1981 |
| JP | H11-294255 | A | 10/1999 |
| JP | 2013-530340 | A | 7/2013 |
| JP | 2016-075270 | A | 5/2016 |
| JP | 2017-089410 | A | 5/2017 |
| JP | 2017-089411 | A | 5/2017 |

* cited by examiner

INTERNAL COMBUSTION ENGINE

CROSS-REFERENCE TO RELATED APPLICATIONS

The present application claims priority to Japanese Patent Applications number 2022-066317, filed on Apr. 13, 2022 contents of which are incorporated herein by reference in their entirety.

BACKGROUND OF THE INVENTION

The present disclosure relates to an internal combustion engine including a cylinder and a piston.

In an internal combustion engine, a ring member is provided to a stepped portion formed on an upper portion of an inner peripheral surface of a cylinder. For example, Japanese Unexamined Patent Application Publication No. 2017-089410 discloses an internal combustion engine in which a scraper ring is provided to a stepped portion in order to remove soot adhered to a piston.

Since the above-described ring member is not fixed to the stepped portion, the ring member may move due to vibration and come into contact with the piston during the operation of the internal combustion engine. When the ring member contacts the piston, at least one of the ring member or the piston may be damaged.

BRIEF SUMMARY OF THE INVENTION

The present disclosure has been made in view of these points, and its object is to prevent the ring member from coming into contact with the piston during the operation of the internal combustion engine.

An aspect of the present disclosure provides an internal combustion engine including: a cylinder in which a piston reciprocates; a cylinder head positioned above the cylinder; a gasket disposed between the cylinder and the cylinder head; a stepped portion that is formed at an upper end portion of an inner peripheral surface of the cylinder and positioned below the gasket; a ring member having a cylindrical shape provided to the stepped portion; and a protrusion portion that is formed in a manner to protrude from the ring member and bites into a lower surface of the gasket.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Configuration of the International Combustion Engine>

A configuration of an internal combustion engine according to an embodiment will be described with reference to FIG. 1.

Figure 1:
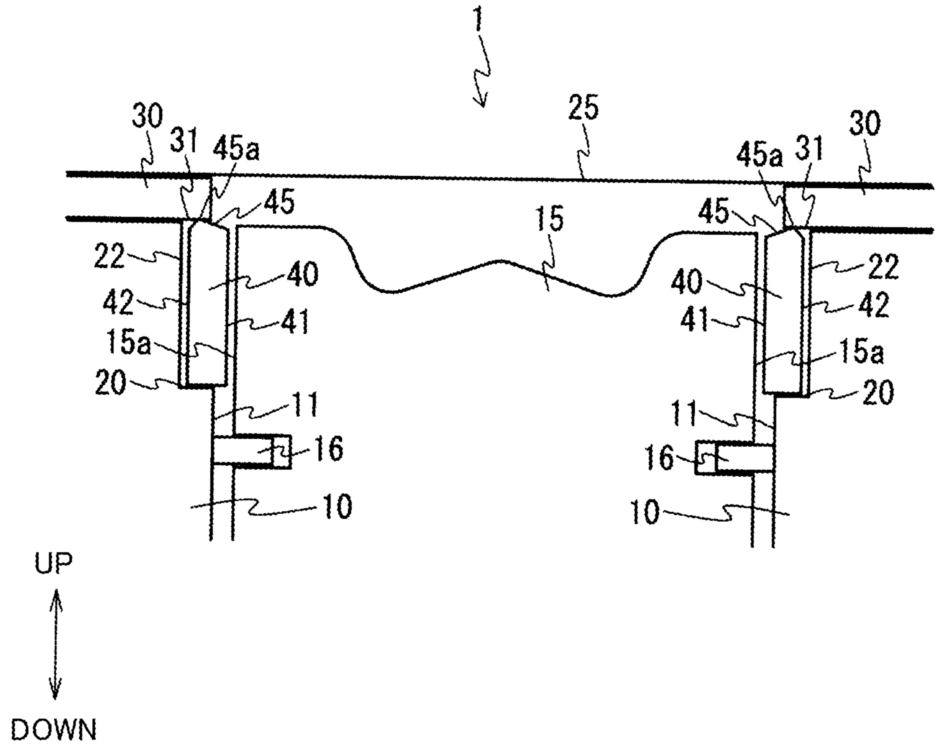
FIG. 1 is a schematic view illustrating an internal configuration of an internal combustion engine 1 according to an embodiment.

FIG. 1 is a schematic view illustrating an internal configuration of an internal combustion engine 1 according to an embodiment. In FIG. 1, only a portion of the internal combustion engine 1 is shown, and other components are omitted for convenience of explanation.

The internal combustion engine 1 is, for example, an engine mounted in a vehicle. As shown in FIG. 1, the internal combustion engine 1 includes a cylinder 10, a piston 15, a stepped portion 20, a cylinder head 25, a gasket 30, and a ring member 40.

The cylinder 10 is made of metal and formed in a cylindrical shape. The piston 15 is housed in the cylinder 10.

The piston 15 reciprocates between the top dead center and the bottom dead center in the cylinder 10. In FIG. 1, the piston 15 is positioned at the top dead center. A piston ring 16 is fitted into a groove formed on the outer peripheral surface 15*a* of the piston 15.

As shown in FIG. 1, the stepped portion 20 is positioned at an upper end portion of the inner peripheral surface 11 of the cylinder 10. The stepped portion 20 is positioned above the piston ring 16 when the piston 15 is positioned at the top dead center. The stepped portion 20 is formed such that the stepped portion 20 extends circumferentially inside the inner peripheral surface 11 of the cylinder 10. The stepped portion 20 is positioned below the gasket 30. The stepped portion has an inner peripheral surface 22 that is perpendicular to the bottom surface of the stepped portion 20.

The cylinder head 25 is positioned above the cylinder 10. The cylinder head 25 is made of metal, and is made of the same material as the cylinder 10, for example. The gasket 30 is disposed between the cylinder 10 and the cylinder head 25. The gasket 30 has a function of enhancing airtightness in the cylinder 10. A side surface of the gasket 30 is positioned closer to the piston 15 than the inner peripheral surface 22 of the stepped portion 20 in the radial direction of the cylinder 10.

As shown in FIG. 1, the ring member 40 is provided to the stepped portion 20. Specifically, the ring member 40 is fitted into the stepped portion 20. The ring member 40 is formed in a cylindrical shape and covers the circumference of the piston 15 positioned at the top dead center. The ring member 40 is made of metal. Here, the ring member 40 is made of the same material as the cylinder 10, but is not limited thereto, and may be made of a different material than the cylinder 10. Further, the ring member 40 is made of a material harder than that of the gasket 30.

The inner peripheral surface 41 of the ring member 40 faces the outer peripheral surface 15*a* of the piston 15 positioned at the top dead center in a state of being separated therefrom. The outer peripheral surface 42 of the ring member 40 faces the inner peripheral surface 22 of the stepped portion 20 in a state of being separated therefrom. The lower surface of the ring member 40 is in contact with the bottom surface of the stepped portion 20.

The ring member 40 is provided to narrow the space between the cylinder 10 and the piston 15. That is, the inner peripheral surface 41 of the ring member 40 is positioned closer to the outer peripheral surface 15*a* of the piston 15 than the inner peripheral surface 11 of the cylinder 10. If the ring member 40 is not provided, the space between the inner peripheral surface 11 of the cylinder 10 and the outer peripheral surface 15*a* of the piston 15 ends up being a useless space, which is not used for combustion, thereby reducing combustion efficiency. On the other hand, if the ring member 40 is provided as in the present embodiment, it is possible to narrow the useless space, and thus the compression ratio is increased and fuel efficiency is improved.

As shown in FIG. 1, the ring member 40 has a protrusion portion 45. The protrusion portion 45 is formed such that the protrusion portion 45 protrudes from the ring member 40. Specifically, the protrusion portion 45 protrudes from the upper surface of the ring member 40. The protrusion portion 45 bites into a lower surface 31 of the gasket 30. Specifically, an edge 45*a* of the tip of the protrusion portion 45 bites into the lower surface 31 of the gasket 30. Since the protrusion portion 45 bites into the lower surface 31 of the gasket 30, it is possible to prevent the ring member 40 from moving due to vibration.

The protrusion portion 45 is formed in an annular shape along the circumferential direction on an upper portion of the ring member 40. Therefore, the protrusion portion 45 bites into the lower surface 31 of the gasket 30 in a wide area. However, the present disclosure is not limited thereto, and the protrusion portion 45 may be partially formed on the upper surface of the ring member 40. For example, a plurality of protrusion portions 45 are formed on the upper surface of the ring member 40 at predetermined intervals in the circumferential direction. Further, a plurality of protrusion portions 45 are formed on the upper surface of the ring member 40 at predetermined intervals in the radial direction of the ring member 40. In this case, since the protrusion portion 45 partially bites into the lower surface 31, a strong biting force is likely to be generated against the lower surface 31 of the gasket 30.

The benefit of providing the protrusion portion 45 on the ring member 40 will be described in detail in comparison with the comparative example shown in FIG. 2.

Figure 2:
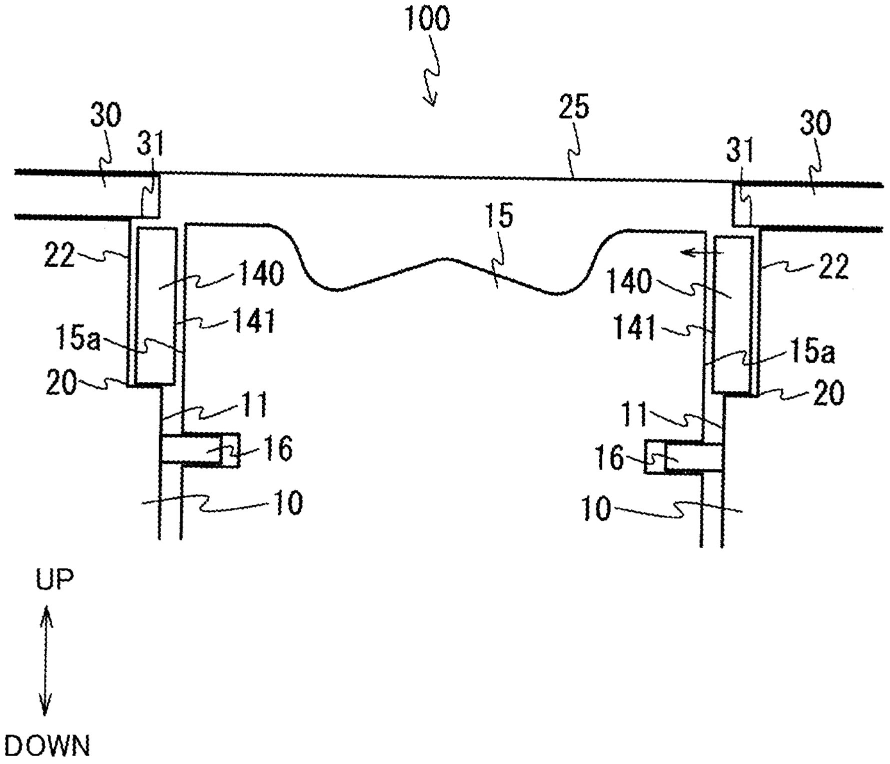
FIG. 2 is a schematic view illustrating an internal combustion engine 100 according to a comparative example.

FIG. 2 is a schematic view illustrating an internal combustion engine 100 according to the comparative example. In the comparative example, the protrusion portion 45 shown in FIG. 1 is not provided to the ring member 140. The upper surface of the ring member 140 is not in contact with the lower surface 31 of the gasket 30. In this case, since the ring member 140 is only fitted into the stepped portion 20, the ring member 140 may move due to vibration during the operation of the internal combustion engine 100. For example, when the ring member 140 moves in a direction shown by an arrow in FIG. 2, the inner peripheral surface 141 of the ring member 140 would come into contact with the outer peripheral surface 15*a* of the piston 15. When the ring member 140 contacts the piston 15, at least one of the ring member 140 or the piston 15 may be damaged.

On the other hand, in the present embodiment, since the protrusion portion 45 of the ring member 40 bites into the lower surface 31 of the gasket 30, even if the internal combustion engine 1 vibrates, it is possible to prevent the ring member 40 from moving due to the vibration. In particular, since the edge 45*a* of the protrusion portion 45 bites into the lower surface 31, it is possible to stop the ring member 40 from moving due to the vibration. As a result, since the inner peripheral surface 41 of the ring member 40 does not contact the outer peripheral surface 15*a* of the piston 15, damage to the ring member 40 and the piston 15 can be prevented.

<Modified Example>

Figure 3:
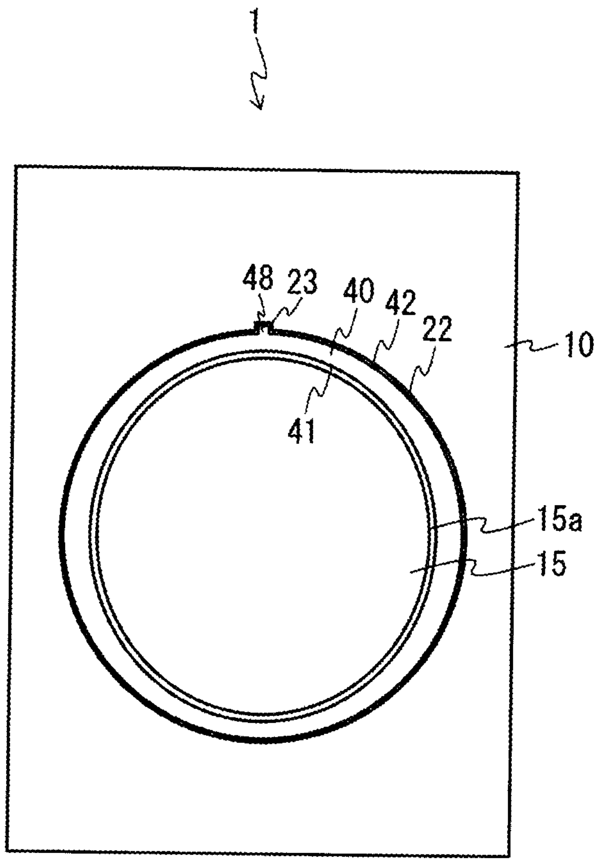
FIG. 3 is a schematic view illustrating a modified example of the internal combustion engine 1.

FIG. 3 is a schematic view illustrating a modified example of the internal combustion engine 1. In FIG. 3, only a portion of the internal combustion engine 1 is shown, and other components are omitted for convenience of explanation.

The piston 15 is decentered in consideration of thermal expansion. Specifically, as shown in FIG. 3, the outer peripheral surface 15*a* of the piston 15 is an ellipse when the piston 15 is viewed in a plane.

In the modified example, the outer peripheral surface 42 of the ring member 40 is a true circle when the ring member 40 is viewed in a plane, whereas the inner peripheral surface 41 of the ring member 40 is an ellipse when the ring member 40 is viewed in a plane. Therefore, the width of the ring member 40 is not constant in the circumferential direction. The distance between the inner peripheral surface 41 and the outer peripheral surface 15*a* is constant over the entire circumference in the circumferential direction. In this case, the distance between the inner peripheral surface 41 and the outer peripheral surface 15*a* can be reduced, as compared with the case where the inner peripheral surface 41 is a true circle.

Figure 4:
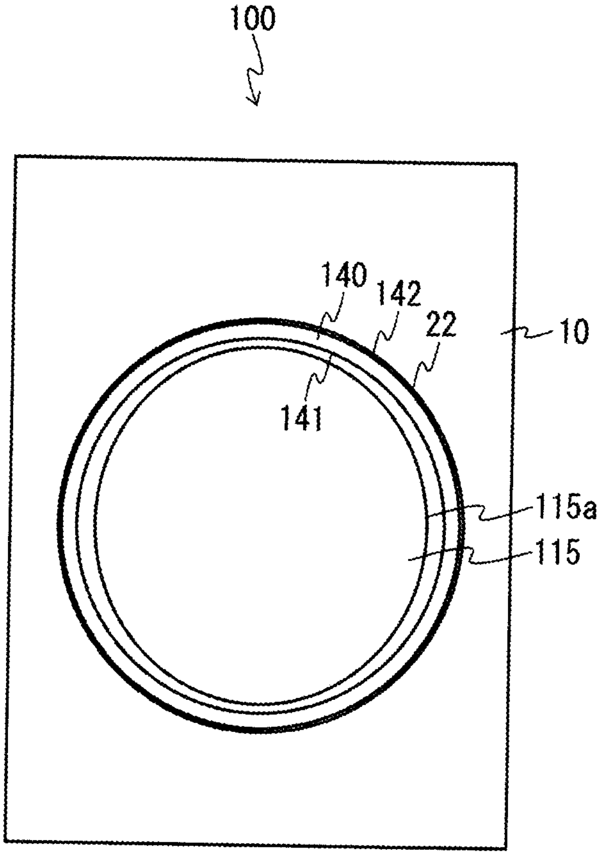
FIG. 4 is a schematic view illustrating an internal combustion engine 100 according to a comparative example.

FIG. 4 is a schematic view illustrating an internal combustion engine 100 according to the comparative example. In the comparative example, the outer peripheral surface 115*a* of the piston 115 is an ellipse, whereas the inner peripheral surface 141 and the outer peripheral surface 142 of the ring member 140 are true circles. Therefore, as shown in FIG. 4, the gap between the outer peripheral surface 115*a* and the inner peripheral surface 141 is not constant, and there are a mix of portions where the gap is large and portions where the gap is small.

On the other hand, in the case of the modified example, since the inner peripheral surface 41 of the ring member 40 is an ellipse in a similar manner as the outer peripheral surface 15*a* of the piston 15, the distance between the inner peripheral surface 41 and the outer peripheral surface 15*a* can be reduced over the entire circumference in the circumferential direction. Therefore, the gap between the inner peripheral surface 41 and the outer peripheral surface 15*a* becomes smaller than in the comparative example, and the significance of providing the above-described ring member 40 (reducing useless space between the cylinder 10 and the piston 15 to prevent reduction in combustion efficiency) is effectively realized.

Further, in the modified example, the ring member 40 has a convex portion 48 protruding outwards from the outer peripheral surface 42 in the radial direction as shown in FIG. 3. The convex portion 48 is formed along the axial direction of the ring member 40. For example, the convex portion 48 is formed from one end to the other end in the axial direction of the ring member 40. On the other hand, a concave portion 23 fitted into the convex portion 48 is formed on the inner peripheral surface 22 of the stepped portion 20. Thus, even if the ring member 40 attempts to rotate in the circumferential direction during the operation of the internal combustion engine 1, the convex portion 48 and the concave portion 23 fitting with each other function as a rotation stopper. Although one convex portion 48 and one concave portion 23 are provided in FIG. 4, the present disclosure is not limited thereto, and a plurality of convex portions 48 and a plurality of concave portions 23 may be provided. Although not shown in FIG. 4, the above-described protrusion portion 45 is formed on the ring member 40 in the modified example as well.

<Effects of the Present Embodiment>

The internal combustion engine 1 of the above-described embodiment includes the ring member 40 having a cylindrical shape provided to the stepped portion 20 formed at an upper end portion of the inner peripheral surface 11 of the cylinder 10. The ring member 40 is provided with the protrusion portion 45 protruding in such a manner that the protrusion portion 45 bites into the lower surface 31 of the gasket 30.

Since the protrusion portion 45 of the ring member 40 bites into the lower surface 31 of the gasket 30, even if the internal combustion engine 1 vibrates, it is possible to prevent the ring member 40 from moving due to vibration. As a result, since the inner peripheral surface 41 of the ring member 40 does not contact the outer peripheral surface 15*a* of the piston 15, damage to the ring member 40 and the piston 15 can be prevented.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. An internal combustion engine comprising:

a cylinder in which a piston reciprocates;

a cylinder head positioned above the cylinder;

a gasket disposed between the cylinder and the cylinder head;

a stepped portion that is formed at an upper end portion of an inner peripheral surface of the cylinder and positioned below the gasket;

a ring member having a cylindrical shape provided to the stepped portion; and a protrusion portion that is formed in a manner to protrude from the ring member and bites into a lower surface of the gasket.

2. The internal combustion engine according to claim 1, wherein an edge of a tip of the protrusion portion bites into a lower surface of the gasket.

3. The internal combustion engine according to claim 1, wherein a side surface of the gasket is positioned closer to the piston than an inner peripheral surface of the stepped portion, in a radial direction of the cylinder, and the protrusion portion protrudes from an upper surface of the ring member.

4. The internal combustion engine according to claim 1, wherein the protrusion portion is formed in an annular shape on an upper portion of the ring member along a circumferential direction.

5. The internal combustion engine according to claim 3, wherein a plurality of the protrusion portions are formed on the upper surface of the ring member at predetermined intervals in a circumferential direction.

6. The internal combustion engine according to claim 3, wherein a plurality of the protrusion portions are formed on the upper surface of the ring member at predetermined intervals in the radial direction.

7. The internal combustion engine according to claim 1, wherein an outer peripheral surface of the piston is an ellipse when the piston is viewed in a plane, and an inner peripheral surface of the ring member facing the outer peripheral surface is an ellipse such that the inner peripheral surface is separated from the outer peripheral surface by a predetermined distance when the ring member is viewed in a plane.

8. The internal combustion engine according to claim 7, wherein the ring member has a convex portion protruding outwards from the outer peripheral surface in a radial direction, and a concave portion fitted into the convex portion is formed on an inner peripheral surface of the stepped portion.

9. The internal combustion engine according to claim 8, wherein the convex portion is formed from one end to the other end in an axial direction of the ring member.

10. The internal combustion engine according to claim 7, wherein an outer peripheral surface of the ring member is a true circle when the ring member is viewed in a plane.

* * * * *